United States Patent [19]

Poncha et al.

[11] 4,151,261

[45] Apr. 24, 1979

[54] METHOD OF PREPARING SODIUM LIQUORS LOW IN CALCIUM

[75] Inventors: Rustom P. Poncha; Alan B. Gancy, both of Syracuse, N.Y.

[73] Assignee: Allied Chemical Corporation, Morris Township, Morris County, N.J.

[21] Appl. No.: 587,579

[22] Filed: Jun. 17, 1975

[51] Int. Cl.² .............................................. C01D 7/00
[52] U.S. Cl. ................................ 423/206 T; 423/208
[58] Field of Search ............................ 423/206 T, 208

[56] References Cited
U.S. PATENT DOCUMENTS 3,655,331   4/1972   Seglin et al. ..................... 423/206 T Primary Examiner—O. R. Veritz
Assistant Examiner—Wayne A. Langel
Attorney, Agent, or Firm—Gerhard H. Fuchs; Gerard P. Rooney; Anthony J. Stewart

[57] ABSTRACT

A method for dissolving calcined trona containing calcareous impurities, to obtain an aqueous sodium carbonate solution having low calcium content involves contacting calcined trona in countercurrent flow, desirably under specific temperature conditions, with dilute sodium carbonate solution. Sodium carbonate solutions thus obtained have reduced tendency to form calcium deposits in processing equipment.

3 Claims, 1 Drawing Figure

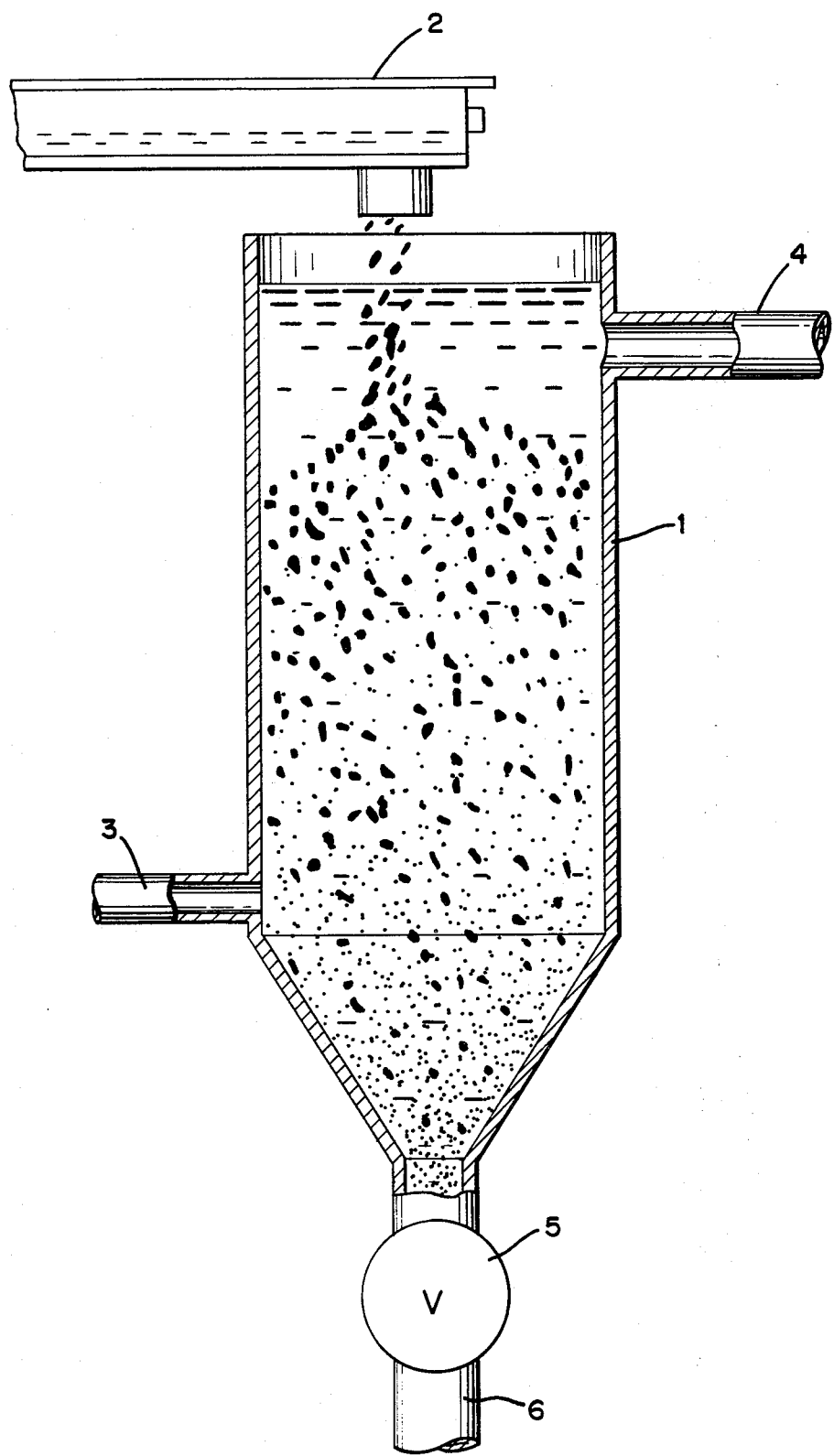

METHOD OF PREPARING SODIUM LIQUORS LOW IN CALCIUM

BACKGROUND OF THE INVENTION AND OF THE PRIOR ART

Although large amounts of soda ash (anhydrous sodium carbonate) are produced by the well known Solvay Process, an increasing amount is obtained from natural trona, large deposits of which are found in the vicinity of Green River, Wyo. at depths varying from 800 to 1800 feet. The trona beds are generally sandwiched between, the sometimes contaminated with stratifications of shale. The trona consists mainly of sodium sesquicarbonate ($Na_2CO_3.NaHCO_3.2H_2O$), and typically contains about 4 to 6 percent of insoluble matter consisting largely of shale, but also containing calcareous minerals such as calcite ($CaCO_3$) and shortite ($Na_2CO_3.2CaCO_3$).

In the production of sodium carbonate from natural trona, it is common procedure to calcine the trona to form crude sodium carbonate:

$$2Na_2CO_3.NaHCO_3.2H_2O \rightarrow 3Na_2CO_3 + 5H_2O + CO_2$$

The sodium carbonate thus obtained is dissolved in water or process liquors, usually dilute sodium carbonate liquors. In that operation, calcerous minerals also dissolve to some extent, so that the resulting sodium carbonate solution may contain up to about 50 parts per million (ppm) of dissolved calcium salts, expressed as calcium.

During subsequent operations, super-solubilized calcium salts tend to deposit from the process liquors to form hard, tenaciously adhering scale on the surfaces of processing equipment, such as heat exchangers, pumps and lines, particularly in zones of high turbulence and high temperature. These scale deposits predominantly consist of pirssonite ($Na_2CO_3.CaCO_3.2H_2O$) in the form of a compact, adherent crystalline mass which may vary in thickness from a thin film to a layer of ¼" thickness or more. These deposits not only restrict fluid flow and heat transfer, but also cause pitting, corrosion and breakdown of moving parts. Because of their hardness and adherence, these deposits are difficult to remove by mechanical means.

Since the source of the calcium is the insoluble matter contained in the trona, it has been proposed to quickly separate the sodium carbonate solution from the insoluble matter, prior to any attempt to remove the solubilized calcium from the solution. This, apparently, has not met with much success and has not obviated the need for periodic mechanical and/or chemical removal of scale from the equipment entailing costly down time.

SUMMARY OF THE INVENTION

In accordance with the present invention, there is provided an improvement in the method of dissolving calcined trona to obtain aqueous sodium carbonate solution and insoluble residue, which improvement comprises contacting calcined trona with an aqueous solvent in counter-current flow such that calcined trona rich in insolubles and substantially denuded of sodium carbonate is contacted with water or aqueous solvent lean in sodium carbonate, desirably at a first temperature within the range of between about 40° and 90° C., and that fresh calcined trona is contacted with aqueous solvent enriched in sodium carbonate, desirably at a second temperature above said first temperature within the range of between about 80° and 110° C.

In a specific embodiment of the present invention, calcined trona is dissolved in an aqueous solvent in staged countercurrent flow employing at least two stages wherein in the first stage water or aqueous solvent lean in sodium carbonate is contacted with solids underflow of calcined trona rich in insolubles and substantially denuded of sodium carbonate, desirably at a temperature within the range of between about 40° and 90° C., and wherein in the last stage overflow solution of aqueous solvent enriched in sodium carbonate is contacted with fresh solids feed of calcined trona, desirably at temperature above the temperature in the first stage and within the range of between about 90° and 110° C. In this particular embodiment, the individual stages may, for example, be aditated vessels, equipped with heating means, if desired, wherein sodium carbonate content of the dissolving liquor and composition of the trona to be dissolved are substantially uniform throughout the mass within any particular vessel representing a stage. Alternatively, staged countercurrent extraction may be conducted in vertically disposed vessels by countercurrent column dissolution as described in the following paragraph, wherein sodium carbonate content of the dissolving liquor and composition of the trona to be dissolved vary within the column.

In another specific embodiment of the improvement of the present invention, dissolution of calcined trona with an aqueous solvent in countercurrent flow is effected by countercurrent column dissolution in a vertically disposed vessel wherein fresh calcined trona is fed to the top of the vessel and water or aqueous solution lean in sodium carbonate is fed at or near the bottom of the vessel, and wherein the calcined trona passes downwardly in the vessel as it is being dissolved countercurrent to the upwardly flowing stream of aqueous sodium carbonate solution. Desirably, the temperature at or near the bottom of the vessel is maintained within the range of between about 40° and 90° C., and the temperature at or near the top of the vessel is maintained within the range of between about 80° and 110° C., the temperature in the intermediate regions being maintained between the above-mentioned temperatures, such that a profile of decreasing temperature from top to bottom is established. Aqueous solvent enriched in sodium carbonate is withdrawn at or near the top of the vessel, and calcined trona substantially denuded of sodium carbonate, or insoluble residue from the calcined trona, is withdrawn at or near the bottom of the vessel. Use of this technique has the particular advantage of furnishing an aqueous solvent enriched in sodium carbonate substantially free of suspended solid impurities. if desired, countercurrent column dissolution as described in this paragraph may be carried out in staged manner, employing two or more vessels in stages, as described in the preceeding paragraph.

In connection with the countercurrent column dissolution embodiment of the improvement of our invention, we have noted that solids feed consisting of relatively coarse calcined trona, in contrast to more finely ground material, offers distinct advantages, in that dispersion and dissolution of calcium bearing minerals seem to be inhibited, and that the rate of dissolution of the sodium carbonate seems to be accelerated.

By dissolving calcined trona in accordance with the improvement of our invention there is obtained an aqueous sodium carbonate solution lower in calcium salts than obtainable by prior art methods. This is based on our surprising discovery that when aqueous sodium carbonate solution containing high concentrations of sodium carbonate, as for example saturated solutions of sodium carbonate, are contacted with the insoluble residues of calcined trona at temperatures in the order of 80° to 110° C., these solutions tend to extract several times as much of the contaminating calcium salts as does a relatively dilute aqueous sodium carbonate solution. For example, when an aqueous solution containing about 28% by weight of sodium carbonate was contacted with the insoluble residues of substantially completely leached calcined trona at temperature of 90° C., the resultant clear solution, after filtration, was found to contain 37 ppm. of calcium. When that experiment was repeated using a 10% sodium carbonate solution under otherwise identical circumstances, the clear solution contained only 6 ppm. of calcium, and a solution containing about 22% by weight of sodium carbonate extracted 18 ppm. of calcium under the same circumstances.

DESCRIPTION OF THE DRAWING

The attached drawing illustrated a preferred embodiment of the improved method of our invention wherein dissolution of calcined trona with an aqueous solvent in countercurrent flow is effected in a vertically disposed vessel. Calcined trona is fed to vertically disposed vessel 1 by means of solids feed conveyor 2 at a rate to maintain solids level within vessel 1 below solution overflow line 4. Dissolving liquor of water or aqueous solution lean in sodium carbonate is fed to vessel 1 near the bottom thereof through solvent feed line 3, rises within vessel 1 countercurrent to the solid calcined trona and is withdrawn from vessel 1 through solution overflow line 4 as an enriched sodium carbonate solution. Calcined trona fed to vessel 1 descends within the vessel countercurrent to the flow of the liquor, and solid residue of the dissolved calcined trona is withdrawn from vessel 1 at the bottom thereof continuously or intermittently through valve 5 and solids residue discharge line 6. Temperature at or near the bottom of the vessel is desirably maintained within the range of between about 40° and 90° C., and temperature at or near the top of the vessel is maintained above that at or near the bottom, and within the range of between about 80° and 110° C. The temperature in the intermediate regions is maintained between the above-mentioned temperatures such that a profile of decreasing temperature from top to bottom is established. Temperature control within the vessel can be effected by controlling the temperature of the liquor fed to vessel 1 in combination with contolling temperature of the calcined trona feed. Alternatively, heat of the mass within vessel 1 can be controlled so as to maintain the required temperature profile through externally or internally located heat exchange means (not shown), or by any other suitable means, such as injection of steam directly into the vessel at a properly chosen location.

DESCRIPTION OF THE PREFERRED EMBODIMENTS

The embodiment of the invention shown in the drawing represents a preferred embodiment and describes the best mode presently contemplated for its practice.

With respect to dissolution temperatures which are desirably maintained because they aid in reducing amount of dissolved calcium, the first temperature at which calcined trona substantially denuded of sodium carbonate is contacted with water or aqueous solvent lean in sodium carbonate is within the range of between about 40° and 90° C., desirably between about 50° and 90° C., and preferably between about 60° and 80° C. The second temperature at which fresh calcined trona and aqueous solvent enriched in sodium carbonate are contacted is within the range of between about 80° and 110° C., desirably between about 90° and 110° C., and preferably between about 100° and 110° C. The temperature in the intermediate regions or stages is maintained between the first and second temperature such that a profile of decreasing temperature is established from the region or stage at which fresh calcined trona is contacted with aqueous solution enriched in sodium carbonate to the region or stage at which calcined trona substantially denuded of sodium carbonate is contacted with water or aqueous solvent lean in sodium carbonate. An "aqueous solvent lean in sodium carbonate," for our purposes, is a sodium carbonate solution containing less than about 25% by weight of sodium carbonate, desirably less than about 20%, preferably less than about 18% by weight of sodium carbonate.

The calcined trona may have been obtained by calcination of trona at any temperature at which substantial transformation of the sodium bicarbonate component of the sodium sesquicarbonate of the natural trona into sodium carbonate is effected. The calcined trona may be of any particle size, preferably is of particle size such that substantially all of the trona will pass through a plate or a screen having 3-inch openings. In the event dissolution is conducted in a vertically disposed leach vessel as illustrated in the drawing, then the calcined trona desirably has a particle size such that substantially all of it will pass through a perforated plate or screen having 3-inch openings, but that a substantial quantity will remain on a perforated plate or screen having one-half inch openings, preferably containing a predominance by weight of particles having an average diameter of between about 1 and 2 inches, for the reasons described above.

The following examples and experiments, wherein parts are by weight unless otherwise indicated, further illustrate the invention and its advantages.

The trona used in the examples and control experiments shown below has the following composition:

| Natural trona | Weight % |
| --- | --- |
| $Na_2CO_3$ | 41.8 |
| $NaHCO_3$ | 33.1 |
| $H_2O$ | 14.1 |
| Insolubles | 11.0 |
| | 100.0 |

The separated insoluble fraction has the following composition:

| Insolubles | Weight % |
| --- | --- |
| Dolomite | 5.5 |
| Quartz | 1.1 |
| Feldspar | 3.3 |
| Clay | 0.6 |
| Shortite | 0.1 |
| Organic matter as elemental carbon | 0.2 |
| Other (by difference) | 0.2 |

-continued

| Insolubles | Weight % |
|---|---|
| | 11.0 |

In each of the experiments and examples, calcium is determined by atomic absorption spectroscopy using a Perkin-Elmer Model 303 spectrophotometer employing a calcium hollow cathode lamp, and air-acetylene fuel. The test solution is acidified to the methyl orange end point, and the absorption measured at 4227 A°, after adding lantanum chloride to suppress anionic chemical interferences. Standard prepared calcium samples are submitted periodically as a check on internal consistency. Calcium levels reported are precise to about 1 ppm.

Calcined trona is crushed to particle size larger than ⅛ inch average diameter, but passing through a screen having 2-inch openings. This material is used in the runs designated: "Calcined Trona A".

Calcined trona is crushed so that substantially all pieces pass through a screen having 174 inch openings. This material is designated as: "Calcined Trona B".

One hundred parts of each of the above forms of calcined trona are slurried with 280 parts of hot 6.25% sodium carbonate solution. Make-up water is added to replace evaporation losses and to provide a total of 380 parts of slurry of calcined trona at 90° C. After 15 minutes, clear liquor is separated from each slurry and analyzed for sodium carbonate and calcium salts, as calcium.

CONTROL RUNS REPRESENTING
TYPICAL BATCHWISE
OPERATION - SODIUM CARBONATE
FROM CALCINED TRONA

| | TEMPERATURE 90° C. - 15 MINUTE EXPOSURE | | | |
|---|---|---|---|---|
| | Calcined Trona "A" | | Calcined Trona "B" | |
| $Na_2CO_3$ wt. % | 27.8 | 28.2 | 28.1 | 27.9 |
| Ca (ppm) | 35 | 36 | 36 | 35 |

It appears that particle size has no appreciable effect on the calcium dissolution in batchwise operation at given temperature.

For the next series of runs, a two-stage continuous countercurrent dissolver is used. Approximately half of the extraction takes place in the first stage, the remainder in the second. Dilute sodium carbonate solution containing 6.25% by weight of $Na_2CO_3$ is fed into the bottom of the second stage, and the calcined trona is fed to the top of the first stage. Partially leached calcined trona is transferred from the first to the second stage, and sodium carbonate solution overflows from the second to the first stage. 100 parts of calcined trona are fed into the first stage, at a uniform rate, and simultaneously 280 parts of 6.25% sodium carbonate solution are fed at a uniform rate into the second stage, countercurrent to the incoming calcined trona. Feed rates are such as to provide a substantially saturated sodium carbonate solution in contact with the incoming calcined trona.

Two sets of runs are made. In the first set, a run is made with calcined trona "A", and one with calcined trona "B". In each case, the 6.25% sodium carbonate solution is fed into the bottom of the second stage at 90° C., and both stages are maintained at 90° C., throughout. Some cooling is required to accomplish this because of the heat of solution of the anhydrous sodium carbonate.

In the second set, conditions are the same with the exception that the dilute 6.25% sodium carbonate solution is introduced into the second stage at 75° C. The temperature is gradually raised as the solution moves away from the feed point in the second stage to 85° C. In the first stage, the temperature continues to rise until the saturated sodium carbonate leaves the first stage at 90° C. Most of the heat, raising the initial temperature in the second stage of 75° C. to the final temperature in the first stage of 90° C. results from the heat of solution, but additional heat is added when and if necessary to obtain this gradual increase in dissolver temperature as the dilute sodium carbonate solution extracts sodium carbonate from the insolubles, in the calcined trona.

Samples of clear saturated extract are taken from the first stage and tested as before for sodium carbonate and for calcium salts as Ca. The batchwise control runs are included for comparison.

CONTINUOUS EXTRACTION OF
$Na_2CO_3$ FROM CALCINED TRONA

| | Batchwise (Control) Const. 90° C. Temp. Calcined Trona | | Continuous Const. 90° C. Temp. Calcined Trona | | Continuous Increasing Temp. 75°-90° C. Calcined Trona | |
|---|---|---|---|---|---|---|
| | "A" | "B" | "A" | "B" | "A" | "B" |
| % $Na_2CO_3$ | 28 | 28 | 29 | 28 | 28 | 29 |
| Ca (ppm) | 35.5 | 35.5 | 17 | 20 | 15 | 18 |

The countercurrent runs produce a liquor having considerably less calcium contamination than those wherein the calcined trona remains in contact with the extracting solution for even as short a time as 15 minutes. In both countercurrent runs, using a coarse calcined trona is definitely beneficial, producing a solution with less calcium contamination than when a more thoroughly crushed calcined trona is used. Similarly, contacting the calcined trona, rich in sodium carbonate, at a lower temperature initially, and bringing up the temperature gradually from 75° to 90° C. produces a sodium carbonate liquor having less calcium contamination than when a constant temperature of 90° C. is held throughout. The best results are obtained when countercurrent flow is combined with use of coarse calcined trona, and with use of the temperature profile as above described.

Since changes may be made in carrying out the above process without departing from the scope of the invention, it is intended that all matter contained in the above description shall be interpreted as illustrative and not in a limiting sense.

We claim:

1. In the process of dissolving calcined trona to obtain aqueous sodium carbonate solution and insolubles which involves contacting the calcined trona with water or aqueous solvent lean in sodium carbonate and separating the resultant aqueous sodium carbonate solution from insolubles, the improvement which comprises: effecting the solution of the calcined trona is countercurrent flow in a vertically disposed vessel, by feeding fresh calcined trona to the top of the vessel and feeding water or aqueous solution lean in sodium carbonate at or near the bottom of the vessel, maintaining the temperature at or near the bottom of the vessel within the range of between about 40° and 90° C. and the temperature at or near the top of the vessel within the range of between about 80° and 110° C. and the temperature in the intermediate regions between the above-mentioned temperatures such that a profile of the decreasing temperature from top to bottom is established, so that the calcined trona passes downwardly in the vessel as it is being dissolved countercurrent to the upwardly flowing stream of aqueous sodium carbonate solution.

2. The improvement of claim 1 wherein the temperature at or near the bottom of the vessel is maintained within the range of between about 50° and 90° C., and wherein the temperature at or near the top of the vessel is maintained within the range of between about 90° and 110° C.

3. The improvement of claim 2 wherein the calcined trona has particle size substantially passing through a perforated plate or screen having 3 inch openings, and being substantially retained on a perforated plate or screen having one half inch openings.

* * * * *

UNITED STATES PATENT AND TRADEMARK OFFICE
CERTIFICATE OF CORRECTION

PATENT NO. : 4,151,261
DATED : April 24, 1979
INVENTOR(S) : Rustom P. Poncha and Alan B. Gancy Page 1 of 2

It is certified that error appears in the above-identified patent and that said Letters Patent are hereby corrected as shown below:

Column 1, line 13, "the" should read -- and --.

Column 1, lines 23 and 24, the formula

"$2Na_2CO_3 \cdot NaHCO_3 \cdot 2H_2O \longrightarrow 3Na_2CO_3 + 5H_2O + CO_2$ -" should read -- $2Na_2CO_3 \cdot NaHCO_3 \cdot 2H_2O \longrightarrow 3Na_2CO_3 + 5H_2O + CO_2$ --.

Column 2, line 17, "aditated" should read -- agitated --.

Column 2, line 54, "if" should read -- If --.

Column 3, line 25, "illustrated" should read -- illustrates --.

UNITED STATES PATENT AND TRADEMARK OFFICE
CERTIFICATE OF CORRECTION

PATENT NO. : 4,151,261

DATED : April 24, 1979

INVENTOR(S) : Rustom P. Poncha and Alan B. Gancy

It is certified that error appears in the above-identified patent and that said Letters Patent are hereby corrected as shown below:

Column 5, line 22, "174" should read -- 1/4 --.

Column 6, line 62, "is" should read -- in --.

Signed and Sealed this

Twenty-fifth Day of September 1979

[SEAL]

Attest:

Attesting Officer

LUTRELLE F. PARKER
*Acting Commissioner of Patents and Trademarks*